(12) United States Patent
Nonaka

(10) Patent No.: US 8,964,367 B2
(45) Date of Patent: Feb. 24, 2015

(54) ELECTRONIC DEVICE AND IMAGE DISPLAY APPARATUS

(75) Inventor: Kenji Nonaka, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 22 days.

(21) Appl. No.: 13/419,163

(22) Filed: Mar. 13, 2012

(65) Prior Publication Data

US 2013/0016459 A1    Jan. 17, 2013

(30) Foreign Application Priority Data

Jul. 11, 2011   (JP) .................................. 2011-153219

(51) Int. Cl.
*H05K 7/00* (2006.01)
*H04N 5/64* (2006.01)

(52) U.S. Cl.
CPC ..................................... *H04N 5/64* (2013.01)
USPC ................. 361/679.24; 361/679.01; 361/752; 361/679.21; 361/679.29; 248/309.1; 248/316.1; 29/428; 349/58

(58) Field of Classification Search
USPC .......... 348/836, 739, 725, 794; 292/8, 11, 95, 292/24, 63, 53, 38, 96, 80, 81, 87; 361/679.24, 679.21
See application file for complete search history.

(56) References Cited

U.S. PATENT DOCUMENTS

| | | | | |
|---|---|---|---|---|
| 5,577,779 A | * | 11/1996 | Dangel | ............................ 292/80 |
| 7,208,686 B1 | * | 4/2007 | Chen et al. | ..................... 174/561 |
| 7,269,003 B1 | * | 9/2007 | Chung et al. | ............. 361/679.33 |
| 7,839,627 B2 | * | 11/2010 | Tanaka et al. | .............. 361/679.3 |
| 7,961,457 B2 | | 6/2011 | Huang | |
| 2004/0090560 A1 | * | 5/2004 | Jang | ............................... 348/836 |
| 2004/0184245 A1 | * | 9/2004 | Yokote et al. | ................. 361/752 |
| 2008/0238269 A1 | * | 10/2008 | Yamanaka | ..................... 312/7.2 |
| 2009/0316341 A1 | | 12/2009 | Huang | |
| 2010/0062323 A1 | * | 3/2010 | Dong et al. | ..................... 429/96 |
| 2010/0066217 A1 | | 3/2010 | Fujikawa et al. | |
| 2010/0210324 A1 | * | 8/2010 | Xu | .............................. 455/575.1 |
| 2011/0310314 A1 | * | 12/2011 | Shirasaka et al. | ............. 348/836 |

FOREIGN PATENT DOCUMENTS

| | | |
|---|---|---|
| CN | 1293413 | 1/2007 |
| CN | 201160351 | 12/2008 |
| CN | 101609215 | 12/2009 |
| JP | H 08327983 | 12/1996 |

(Continued)

OTHER PUBLICATIONS

Japanese Patent Application No. 2011-153219, First Office Action, mailed May 15, 2012, (with English Translation).

(Continued)

*Primary Examiner* — Hung S Bui
*Assistant Examiner* — Michael Matey
(74) *Attorney, Agent, or Firm* — Blakely, Sokoloff, Taylor & Zafman LLP

(57) ABSTRACT

According to one embodiment, an electronic device includes a display panel, a first cover which covers a front side of the display panel, a second cover which covers a rear side of the display panel, a plurality of nail portions on an outer circumferential portion of either one of the first cover and the second cover and directed in a same direction, and a plurality of reception portions on an outer circumferential portion of the other one of the first cover and the second cover and engaging with the plurality of nail portions, respectively.

16 Claims, 13 Drawing Sheets

(56) References Cited

FOREIGN PATENT DOCUMENTS

| JP | 2008-083562 | 4/2008 |
|----|-------------|--------|
| JP | 2008-258750 | 10/2008 |
| JP | 2010-068388 | 3/2010 |

OTHER PUBLICATIONS

Chinese Patent Application No. 2012100809638, Notification of First Office Action, mailed Oct. 10, 2014, (with English Translation).

* cited by examiner

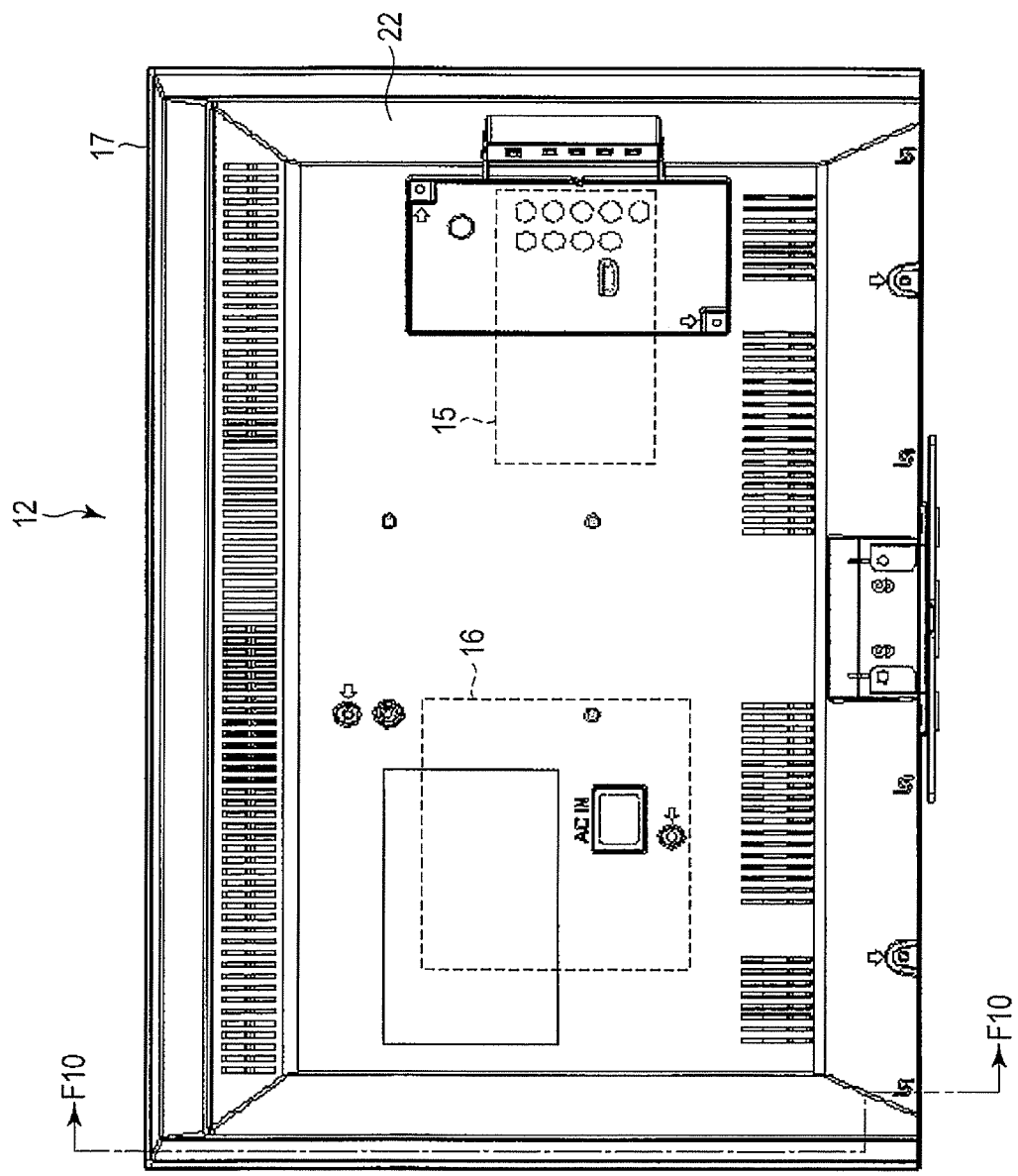
F I G. 2

US 8,964,367 B2

ELECTRONIC DEVICE AND IMAGE DISPLAY APPARATUS

CROSS-REFERENCE TO RELATED APPLICATIONS

This application is based upon and claims the benefit of priority from prior Japanese Patent Application No. 2011-153219, filed Jul. 11, 2011, the entire contents of which are incorporated herein by reference.

FIELD

Embodiments described herein relate generally to an electronic device having a fixation structure.

BACKGROUND

There are display apparatus comprising a front cabinet and a rear cabinet.

As to the structure of fixing the front cabinet and rear cabinet together, there are various modes including a nail structure. On the other hand, not only for the assembling operation, but also the operability for disassembling the front cabinet and rear cabinet from each other, must be considered in some cases. Therefore, there has been a demand for an improvement in such a fixation structure.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary rear view showing a second cover of the television shown in FIG. 1 as viewed from a rear side;

DETAILED DESCRIPTION

Various embodiments will be described hereinafter with reference to the accompanying drawings.

In general, according to one embodiment, an electronic device includes a display panel, a first cover which covers a front side of the display panel, a second cover which covers a rear side of the display panel, a plurality of nail portions on an outer circumferential portion of either one of the first cover and the second cover and directed in a same direction, and a plurality of reception portions on an outer circumferential portion of the other one of the first cover and the second cover and engaging with the plurality of nail portions, respectively.

A first embodiment of a television which is an example of an electronic device will now be described with reference to FIGS. 1 to 11.

In the following embodiments, the near side (that is, the user side) is defined as the front direction F, the far side as viewed from the user is the rear direction R, the left-hand side as viewed from the user is the left direction, the right-hand side as viewed from the user is the right direction, the upper side as viewed from the user is the upper direction U, and the lower side as viewed from the user is the lower direction L.

Figure 1:
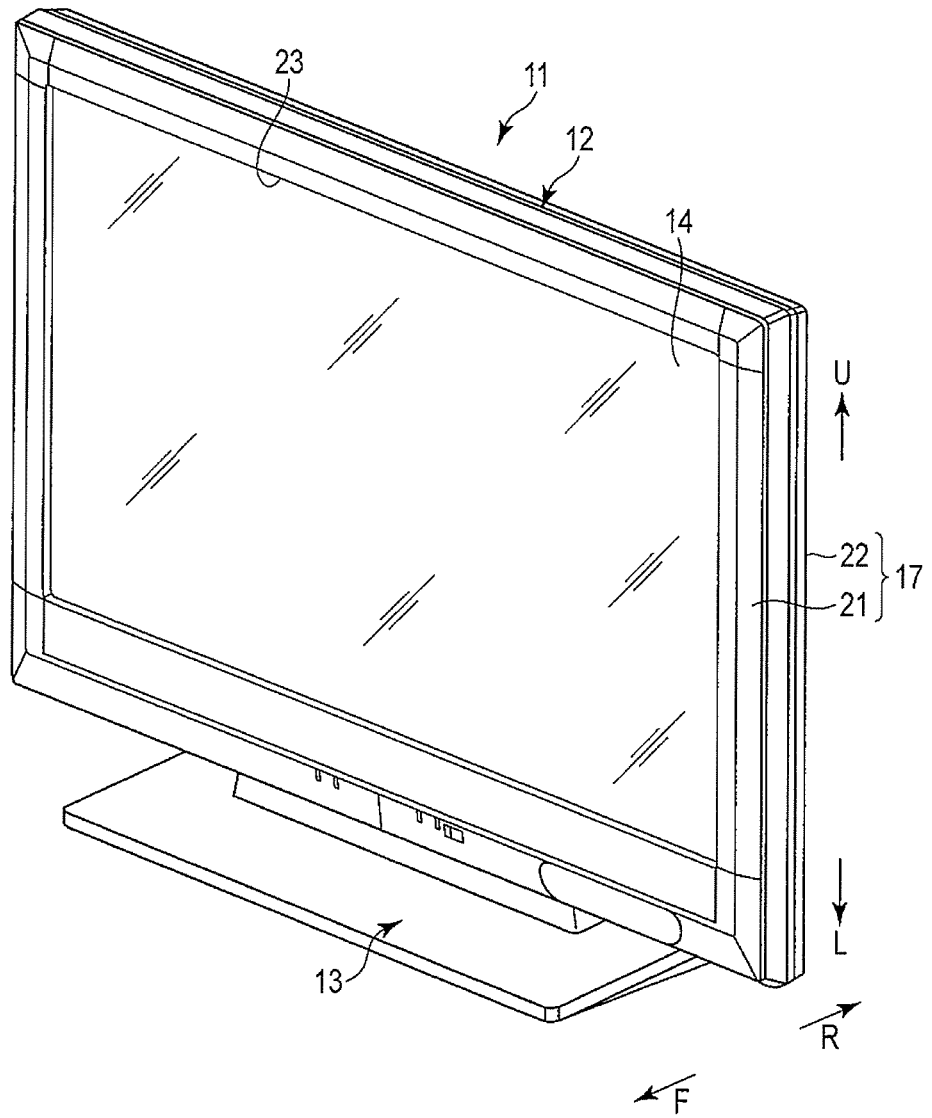
FIG. 1 is an exemplary perspective view showing a television which is an example of an electronic device according to the first embodiment.

As shown in FIG. 1, a television 11 of this embodiment is a flat panel display device having a rectangular appearance. As shown in FIG. 1, the television 11 comprises a display unit 12 (display portion) and a stand 13 (leg portion) which supports the display unit 12.

As shown in FIGS. 1 and 2, the display unit 12 comprises a display panel 14 (display), a main substrate 15 (printed circuit board) and a power substrate 16, provided on a rear surface of the display panel 14, and a case 17 which covers the surroundings of the display panel 14, the main substrate 15 and the power substrate 16. On the main substrate 15, various types of circuit parts such as a CPU, RAM, ROM and tuner are mounted. The case 17 comprises a first cover 21 which covers a front side of the display panel 14 and a second cover 22 which covers a rear side of the display panel 14. The first cover 21 and the second cover 22 are fixed together mainly by the engagement of a plurality of nail portions 25 and a plurality of reception portions 37.

In this embodiment, the display panel 14 comprises, for example, a liquid crystal panel having a rectangular plate shape. The display panel 14 may be some other type of display panel such as a plasma display panel or an organic EL panel.

Figure 3:
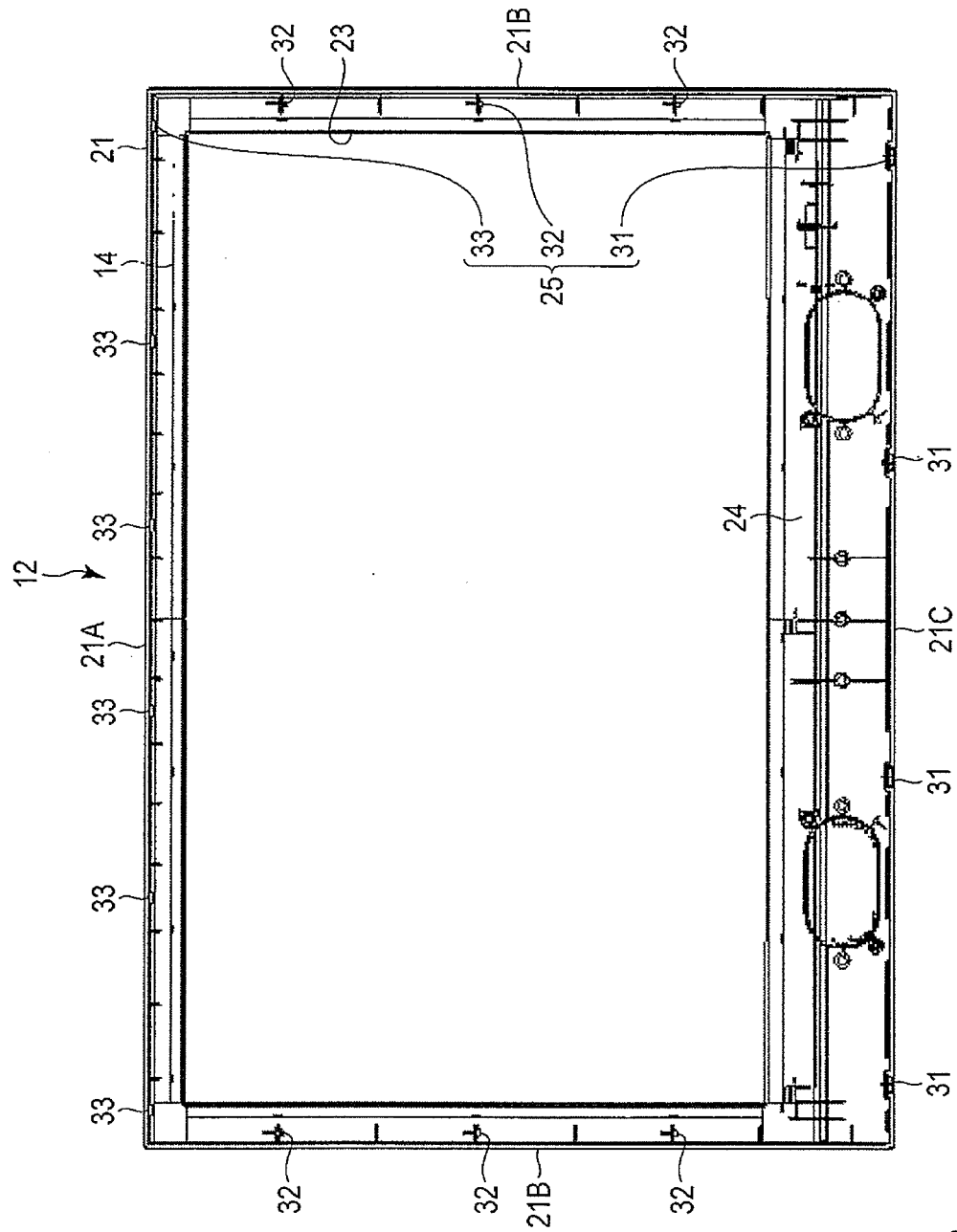
FIG. 3 is an exemplary rear view showing a first cover of the television shown in FIG. 1 as viewed from a rear surface direction (inner surface direction)
Figure 4:
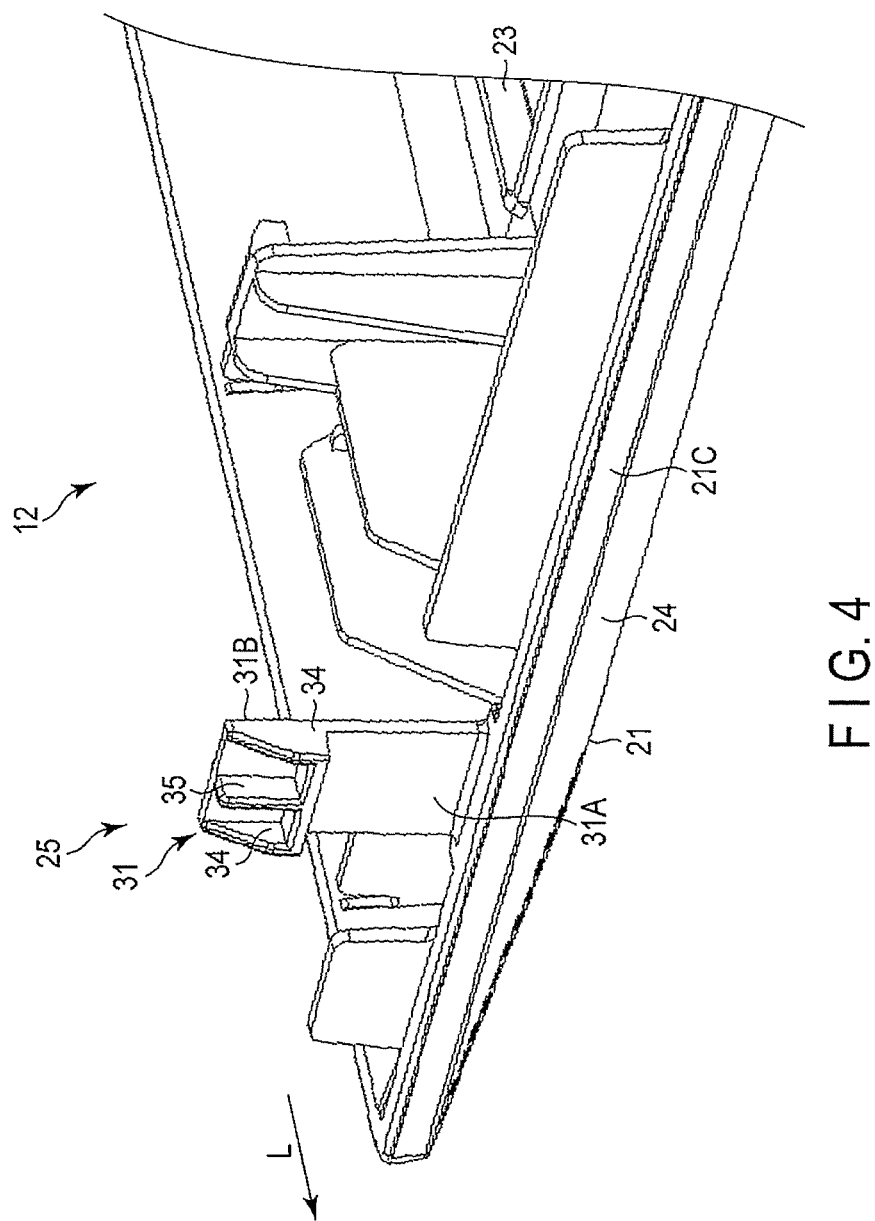
FIG. 4 is an exemplary perspective view showing a first nail portion of the first cover shown in FIG. 3.
Figure 5:
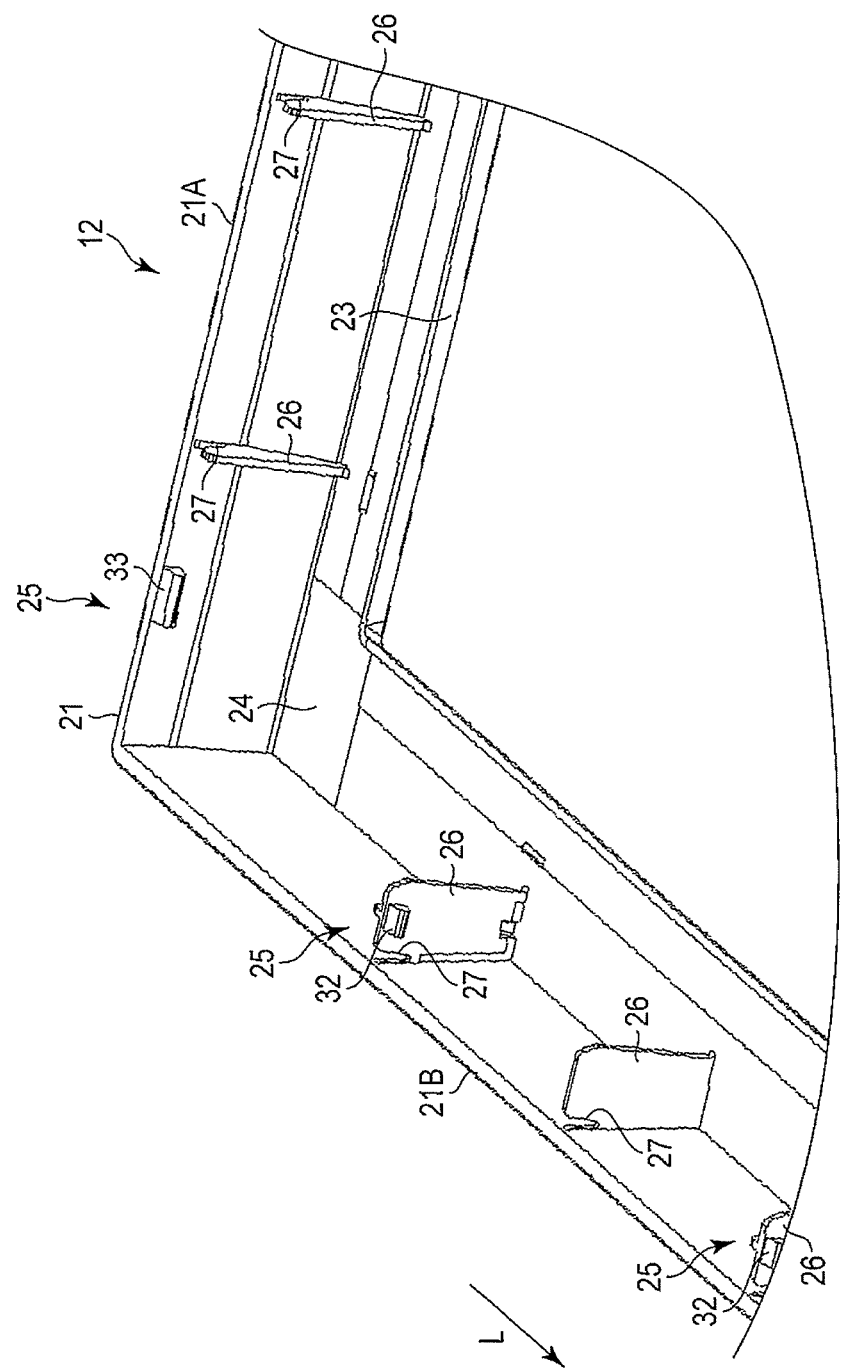
FIG. 5 is an exemplary perspective view showing a second nail portion and a third nail portion of the first cover shown in FIG. 3.

As shown in FIGS. 1 and 3 to 5, the first cover 21 comprises a first main body 24 having a frame like shape with an opening portion at a center which exposes the display panel 14, a plurality of nail portions 25 projecting from the first main body 24 towards the second cover 22, first ribs 26 projecting from the first main body 24 to an inner side of the case 17 (in the direction where the display panel 14 is located). As shown in FIGS. 3 and 5, each of the first ribs 26 abuts against the outer circumferential portion of the display panel 14 to support the display panel 14 while preventing the wobbling of the display panel 14. As shown in FIG. 5, the first rib 26 comprises a groove 27 therein, and as a projection 28 (see FIG. 8) projecting from the second cover 22 is inserted to the groove 27, the second cover 22 is aligned with the first cover 21. As shown in FIG. 3, the first cover 21 comprises a first upper side 21A, a first lateral side 21B and a first lower side 21C.

As shown in FIG. 3, the plurality of nail portions 25 are provided on the outer circumferential portion of, for example, the first cover 21. The plurality of nail portions 25 includes a total of four first nail portions 31 provided on the first lower side 21C, a total of six second nail portions 32 provided on the first lateral side 21B, and a total of six third nail portions 33 provided on the first upper side 21A.

As shown in FIG. 4, each of the first nail portions 31 comprises a plate-like support portion 31A extending from the first lower side 21C, and a hook portion 31B provided on the distal end side of the support portion 31A and projecting so as to hook onto the first reception portion 41 of the second cover 22.

As shown in FIG. 4, the hook portion 31B comprises a first reinforcing rib 34 whose height in the thickness direction of the first cover 21 becomes lower as approaching the second cover 22, and a second reinforcing rib 35 whose height is even in the thickness direction of the first cover 21. The first nail portion 31 (hook portion 31B) projects, for example, towards a lower direction L.

As shown in FIG. 5, each of the second nail portions 32 is provided on one of the surfaces (that is, the lower surface) of the first rib 26, and projects, for example, towards the lower direction L. Each of the third nail portions 33 is provided to project directly from the inner surface of the first upper side 21A. Similarly, each of the third nail portions projects, for example, towards the lower direction L.

Figure 6:
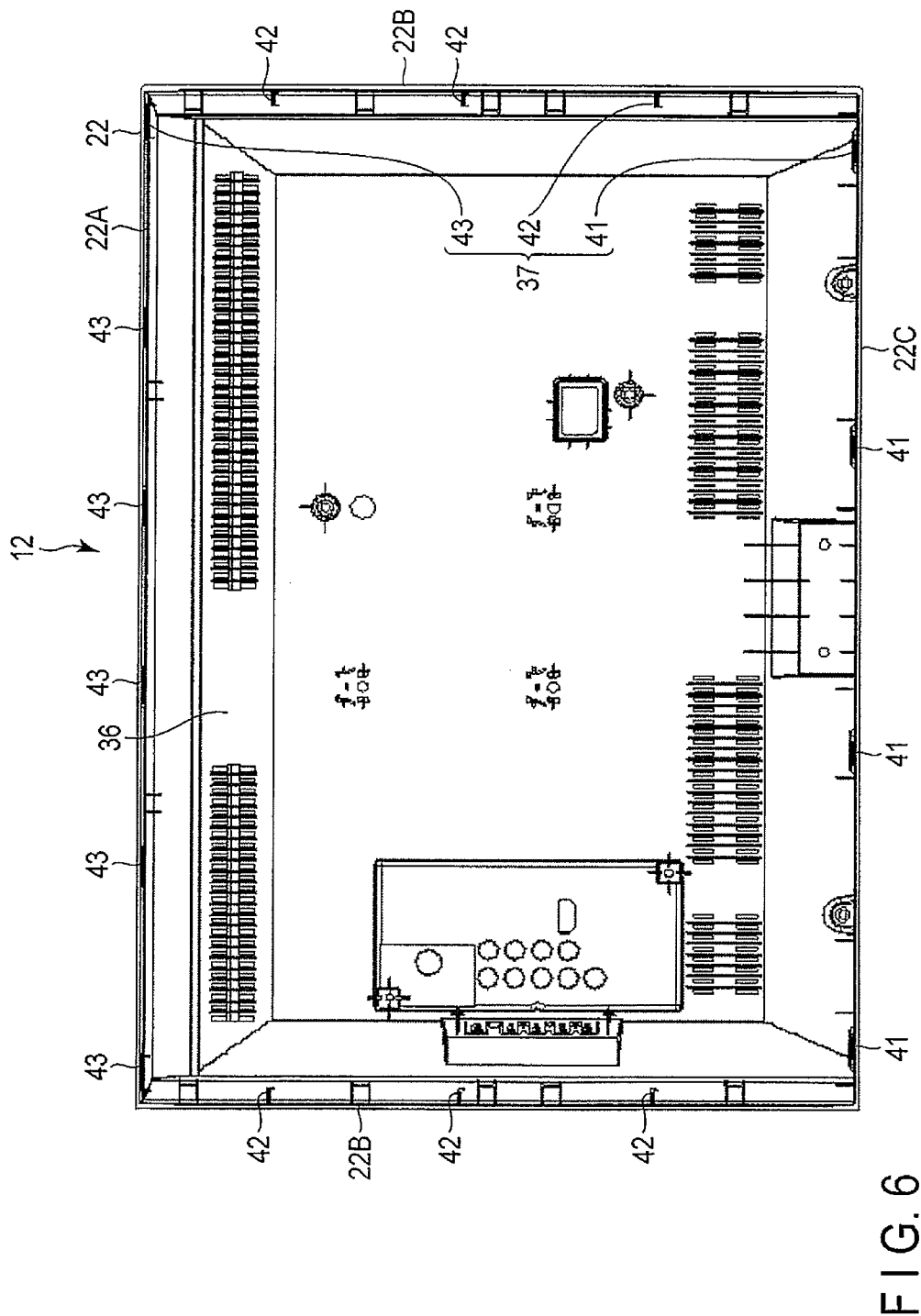
FIG. 6 is an exemplary rear view showing a second cover of the television shown in FIG. 1 as viewed from a rear surface direction (inner surface direction)

As shown in FIG. 6, the second cover 22 comprises a second main body 36, and a plurality of reception portions 37 provided in the second main body 36. Further, the second cover 22 comprises a second upper side 22A, a second lateral side 22B and a second lower side 22C.

The plurality of reception portions 37 are provided on the outer circumferential portion of, for example, the second cover 22. The plurality of reception portions 37 includes a total of four first reception portions 41 provided on the second lower side 22C, a total of six second reception portions 42 provided on the second lateral side 22B, and a total of six third nail portions 43 provided on the second upper side 22A.

Figure 7:
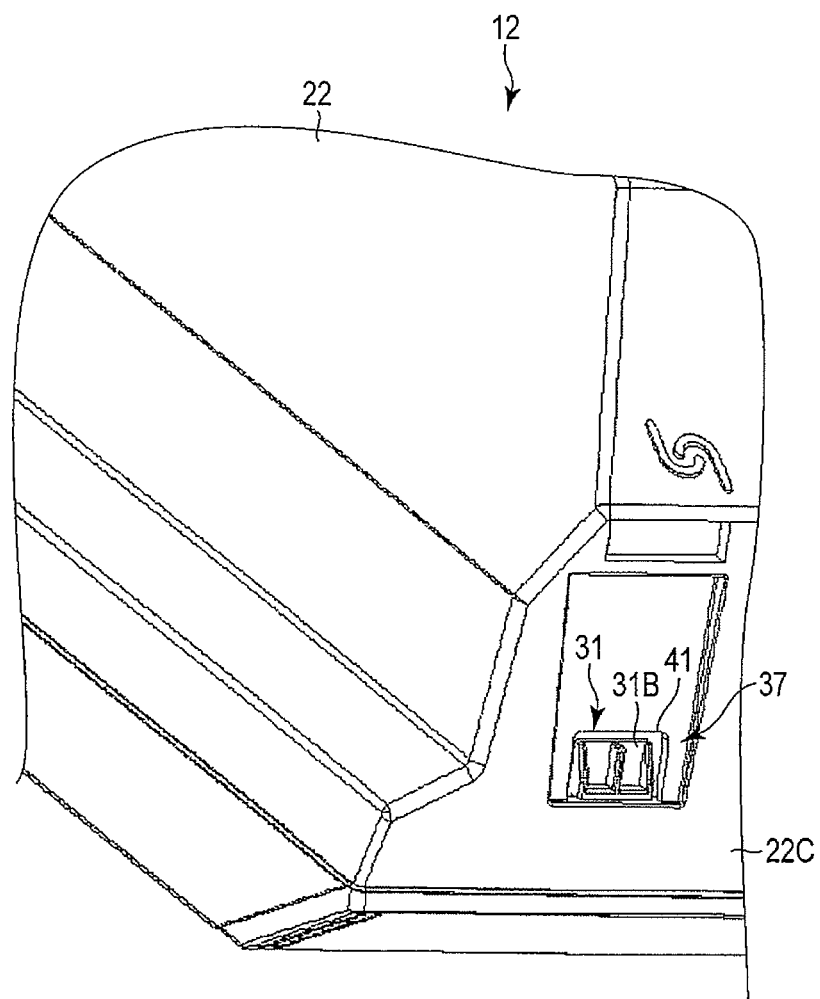
FIG. 7 is an exemplary perspective enlarged view showing a section around a first reception portion of the second cover shown in FIG. 6.

As shown in FIG. 7, each of the first reception portions 41 is a rectangular opening formed in the second lower side 22C. Each of the first nail portions 31 engages with the respective of the first reception portion 41 as the hook portion 31B thereof fits inside the first reception portion 41.

Figure 8:
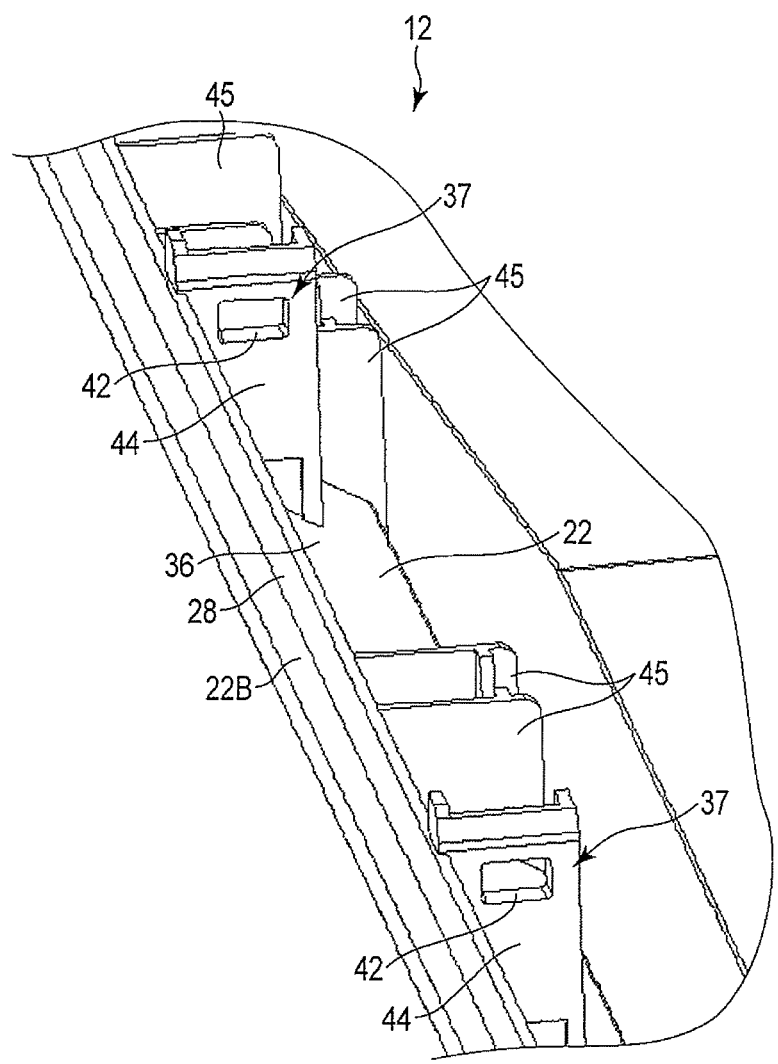
FIG. 8 is an exemplary perspective enlarged view showing a section around a second reception portion of the second cover shown in FIG. 6.

As shown in FIG. 8, each of the second reception portions 42 is a rectangular opening formed in the second rib 44 projecting from the second lateral side 22B towards the inside of the case 17 (in the direction where the display panel 14 is). In this embodiment, the second rib 44 is a rib exclusively for making the second reception portion 42 therein. However, as in the case of the second nail portion 32, the second reception portion 42 may be formed in a rib (the third rib 45) for holding the display panel 14.

Figure 9:
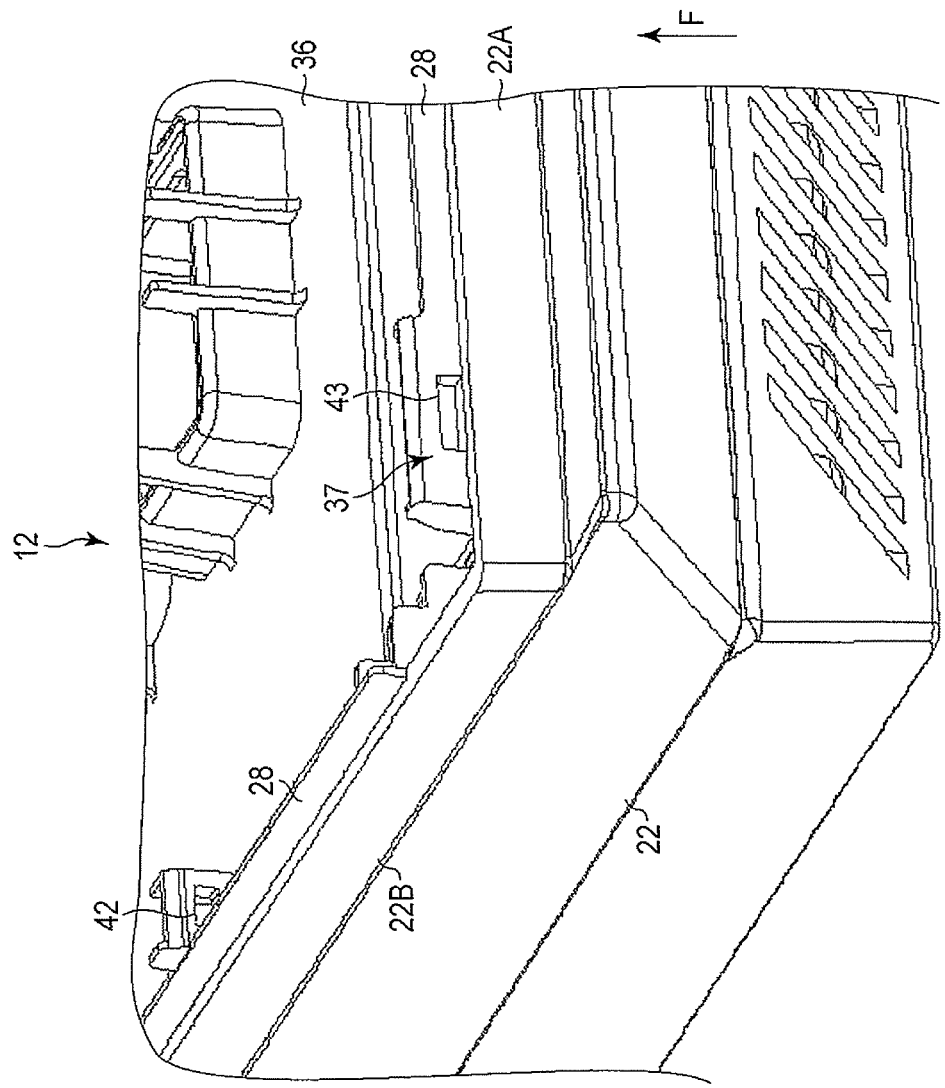
FIG. 9 is an exemplary perspective enlarged view showing a section around a third reception portion of the second cover shown in FIG. 6.

As shown in FIG. 9, each of the third reception portions 43 is a rectangular opening formed in a section projecting from the second upper side 22A towards the direction where the first cover 21 is (the front direction F).

Next, with reference to FIGS. 10 and 11, the step of removing the first cover 21 from the second cover 22 will now be described. Prior to this step, the display portion 12 of the television 11 is placed on a flat table with the surface exposing the display panel 14 (that is, the first cover 21) facing downwards.

Figure 10:
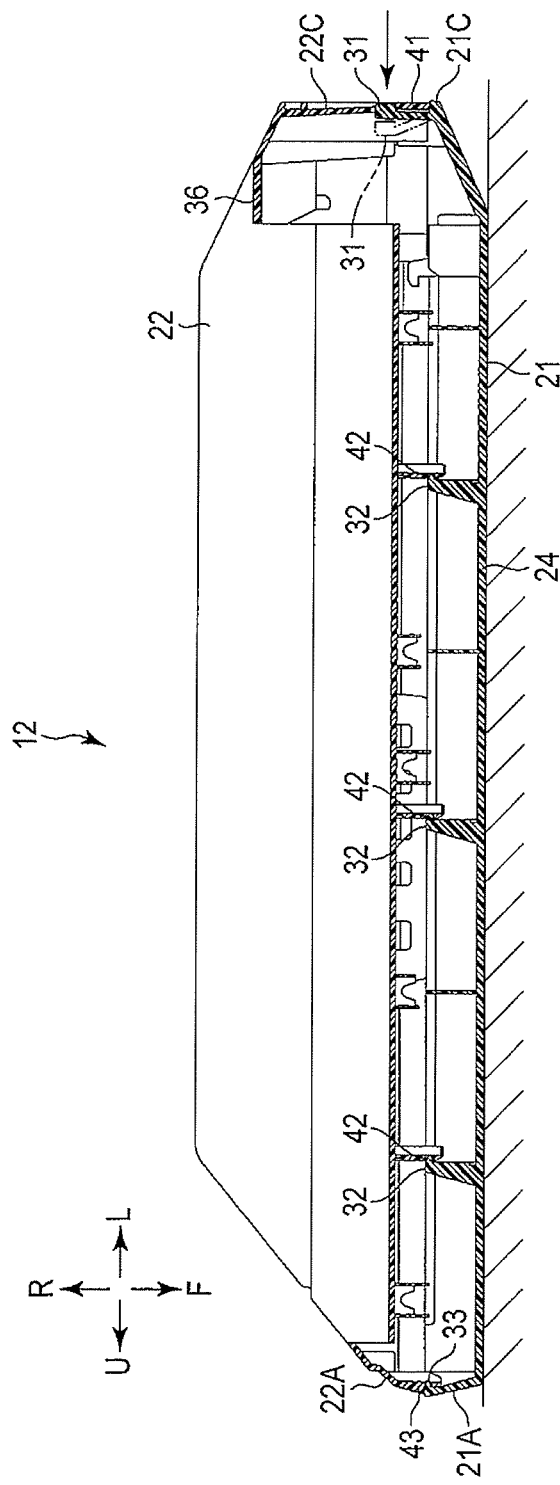
FIG. 10 is an exemplary cross sectional view showing a step of disassembling the first cover and the second cover shown in FIG. 1 from each other.

Then, as shown in FIG. 10, the operator pushes the first nail portion 31 in with a finger so as to release the engagement between the first reception portion 41 and the first nail portion 31. During this operation, the operator can put the finger into the opening which makes the first reception portion 41.

Figure 11:
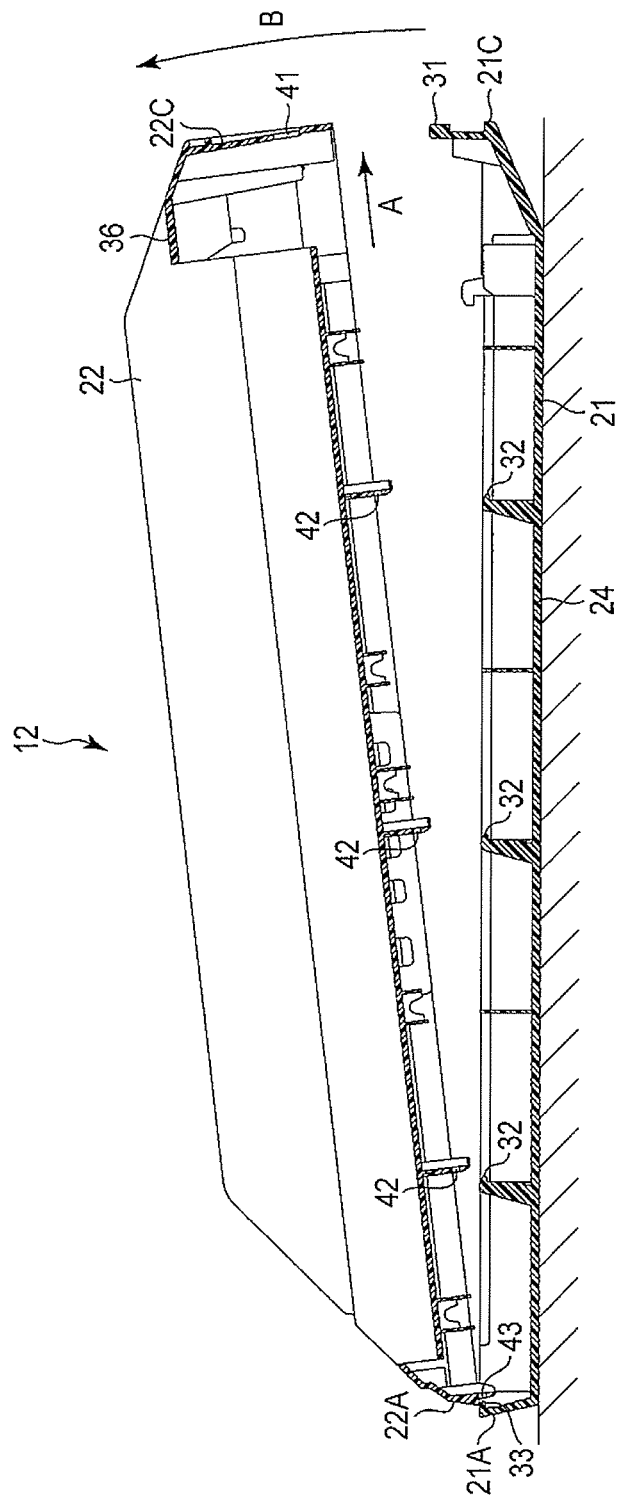
FIG. 11 is an exemplary cross sectional view showing a next step of disassembling the first cover and the second cover shown in FIG. 10 from each other.

Subsequently, as shown in FIG. 11, the vicinity of the second lower side 22C is held by a hand, and also the second cover 22 is rotated in a direction indicated by an arrow B with respect to the vicinity of the third nail portion 33 (the third reception portion 43) so as to pull the second cover 22 upwards. During this operation, the operator while applying a force indicated by the arrow A in FIG. 11 pulls the second cover 22 upwards so as to withdraw the second cover 22 towards the front direction where the operator is. In this manner, the engagement between the second nail portion 32 and the second reception portion 42 is released, and then when the second cover 22 is rotated in the arrow B direction, the engagement between the third nail portion 33 and the third reception portion 43 is released. Thus, the operation of removing the second cover 22 from the first cover 21 (dissembling operation of the case 17) is smoothly carried out.

In this embodiment, the plurality of nail portions 25 are each formed to be directed in the lower direction L, but the direction in which the plurality of nail portions 25 are arranged is not limited to this. As long as they are directed in the same direction, the plurality of nail portions 25 may be directed in any direction (upper direction, right direction or left direction).

According to the first embodiment, the television 11 comprises a display panel 14, a first cover 21 which covers a front side of the display panel 14, a second cover 22 which covers a rear side of the display panel 14, a plurality of nail portions 25 on an outer circumferential portion of the first cover 21 and directed in a same direction, and a plurality of reception portions 37 on an outer circumferential portion of the second cover 22 and engaging with the plurality of nail portions 25, respectively.

With this structure, the plurality of nail portions 25 are directed in the same direction, and therefore the engagement between the plurality of nail portions 25 and the plurality of respective reception portions 37 can be easily released. In this manner, when disassembling the first cover 21 and the second cover 22 form each other for a repair or the like, the disassembling operation can be easily carried out and further an exclusive-use tool is not necessary in the disassembling operation. Moreover, the complex lock mechanism is employed as in the conventional technique, and thus such a drawback that the first cover 21 and the second cover 22 are damaged with a tool or the like, can be avoided. In other words, it is possible to protect these covers, thereby preventing the waste of the first cover 21 and the second cover 22. Consequently, the first cover 21 and the second cover 22 can be assembled together and disassembled from each other repeatedly. Further, the number of screws used for fixation can be decreased, and the number of assembling steps can be reduced.

In this embodiment, the plurality of reception portions 37 each comprise the first reception portion 41 which is to engage with the respective first nail portion 31, and the plurality of nail portions 25 each comprise the first nail portion 31 movable back and forth with a finger. As the first nail portion 31 is manipulated with the finger, the engagement with the first reception portion 41 is released. With this structure, the manipulation of the first nail portions 31 can be done with a finger, and therefore the engagement between the first cover 21 and the second cover 22 can be released without requiring a separate tool.

Further, the television 11 comprises ribs provided on the first cover 21 and holding the display panel 14, and the plurality of nail portions 25 each comprises the second nail portion 32 provided on the respective rib. With this arrangement, the structure can be simplified and the space used inside the first cover 21 and the second cover 22 can be reduced as compared to the case where the ribs and the nail portions 32 are provided separately.

Furthermore, the first nail portion 31 is provided on a lower side of the sides of the first cover 21, and the first reception portion 41 is provided on a lower side of the sides of the second cover 22. With this arrangement, both of the first nail portion 31 and the first reception portion 41 are provided on lower sides, and they cannot be easily seen by the users. In this manner, the appearance of the television 11 can be improved.

The nail portion 31 comprises a first reinforcing rib 34 whose height in the thickness direction of the first cover 21 becomes lower as approaching the second cover 22, and a second reinforcing rib 35 whose height is even in the thickness direction of the first cover 21.

With this arrangement, the first reinforcing rib 34 serves to avoid the first nail portion 31 from being easily hooked on a portion of the second cover 22 when the first cover 21 and the second cover 22 are fixed together, and thus the assembling operation is not hindered. Further, with the second reinforcing rib 35 provided, the operator can use the finger to reliably push the first nail portion 31 without slipping. In this manner, the engagement between the first nail portion 31 and the first reception portion 41 can be reliably released.

Subsequently, with reference to FIGS. 12 and 13, the second embodiment of the electronic device will now be described. The television 11 which is an example of the electronic device of the second embodiment only differs in structure from that of the first embodiment in the respects that a plurality of nail portions 25 are provided on the second cover 22, whereas a plurality of reception portions 37 are provided on the first cover 21, but the rest of the structure is in common with the first embodiment. Therefore, the different portions of the structure will be explained mainly. In the following explanation, the same structural elements will be designated by the same reference symbols, and the explanations or illustrations therefor will be omitted.

Figure 12:
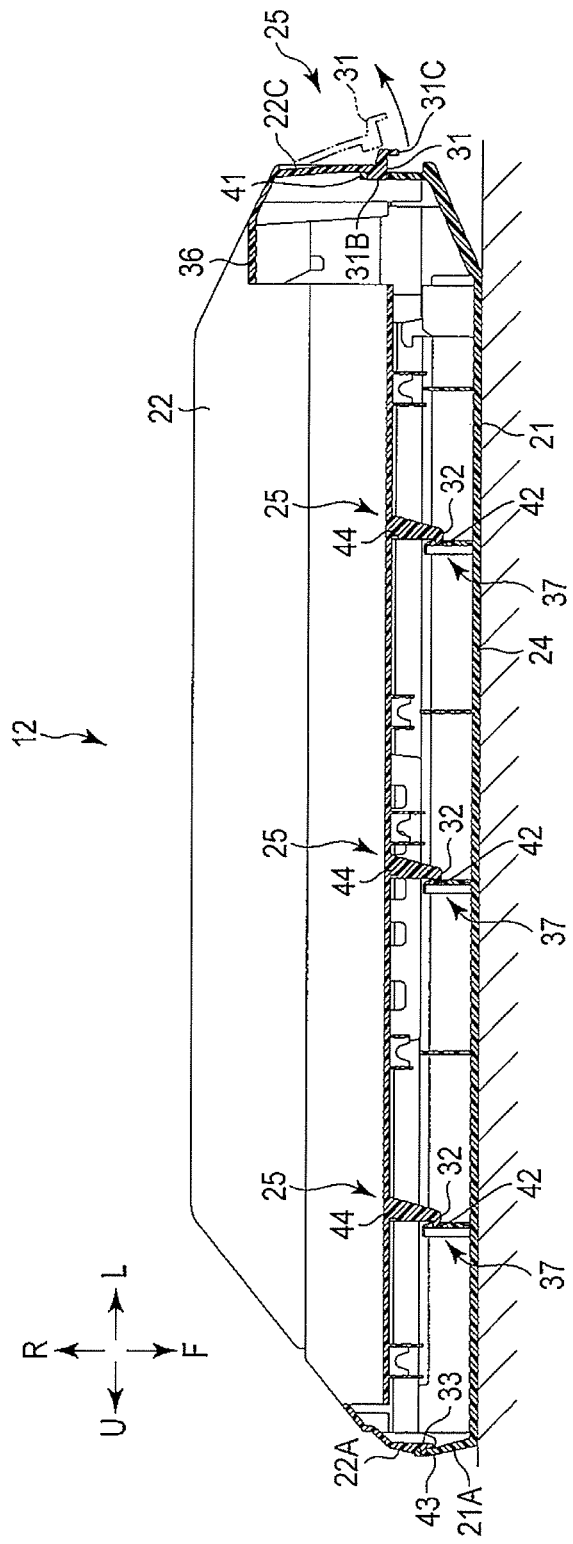
FIG. 12 is an exemplary cross sectional view showing a television which is an example of an electronic device according to the second embodiment.

As shown in FIG. 12, the second cover 22 comprises a second main body 36, a plurality of nail portions 25 projecting from the second main body 36 towards the first cover 21, second ribs 44 projecting from the second main body 36 to an inner side of the case 17 (in the direction where the display panel 14 is located). Each of the second ribs 44 abuts against the outer circumferential portion of the display panel 14 to support the display panel 14 while preventing the wobbling of the display panel 14. Further, the second cover 22 comprises a second upper side 22A, a second lateral side 22B and a second lower side 22C.

The plurality of nail portions 25 are provided on the outer circumferential portion of, for example, the second cover 22. The plurality of nail portions 25 includes a total of four first nail portions 31 provided on the second lower side 22C, a total of six second nail portions 32 provided on the second lateral side 22B, and a total of six third nail portions 33 provided on the second upper side 22A.

Each of the first nail portions 31 comprises a hook portion 31B provided on the distal end side of the support portion 31A and projecting so as to hook onto the first reception portion 41 of the first cover 21, and a finger hook portion 31C on which the operator can hook a finger when the case 17 is to be disassembled. The hook portion 31B comprises a first reinforcing rib 34 whose height in the thickness direction of the second cover 22 becomes lower as approaching the first cover 21, and a second reinforcing rib 35 whose height is even in the thickness direction of the second cover 22. The first nail portion 31 (hook portion 31B) projects, for example, towards an upper direction L of the second cover 22.

Each of the second nail portions 32 is provided on one of the surfaces (that is, the upper surface) of the second rib 44, and projects, for example, towards the upper direction L. Each of the third nail portions 33 is provided to project directly from the second upper side 22A. Similarly, each of the third nail portions 33 projects, for example, towards the upper direction U.

The first cover 21 comprises a first main body 24 having a frame like shape with an opening portion at a center which exposes the display panel 14 and a plurality of reception portions 37 provided in the first main body 24. The first cover 21 further comprises a first upper side 21A, a first lateral side 21B and a first lower side 21C.

The plurality of reception portions 37 are provided on the outer circumferential portion of, for example, the first cover 21. The plurality of reception portions 37 include a total of four first reception portions 41 provided on the first lower side 21C, a total of six second reception portions 42 provided on the first lateral side 21B, and a total of six third nail portions 43 provided on the first upper side 21A.

Each of the first reception portions 41 is a rectangular opening formed in the first lower side 21C. Each of the first nail portions 31 engages with the respective one of the first reception portion 41 as the hook portion 31B thereof fits inside the first reception portion 41.

Each of the second reception portions 42 is a rectangular opening formed in the first rib 26 projecting from the first lateral side 21B towards the inside of the case 17 (in the direction where the display panel 14 is). In this embodiment, the first rib 26 is a rib exclusively for making the second reception portion 42 therein. However, as in the case of the second nail portion 23, the second reception portion 42 may be formed in a rib (the third rib) for holding the display panel 14.

Each of the third reception portions 43 is a rectangular opening formed in a section projecting from the first upper side 21A towards the direction where the second cover is (the rear direction R).

Next, with reference to FIGS. 12 and 13, the step of removing the first cover 21 from the second cover 22 will now be described.

As shown in FIG. 12, the operator hooks a finger on the finger hook portion 31C to lift the first nail portion 31, thereby releasing the engagement between the first reception portion 41 and the first nail portion 31.

Figure 13:
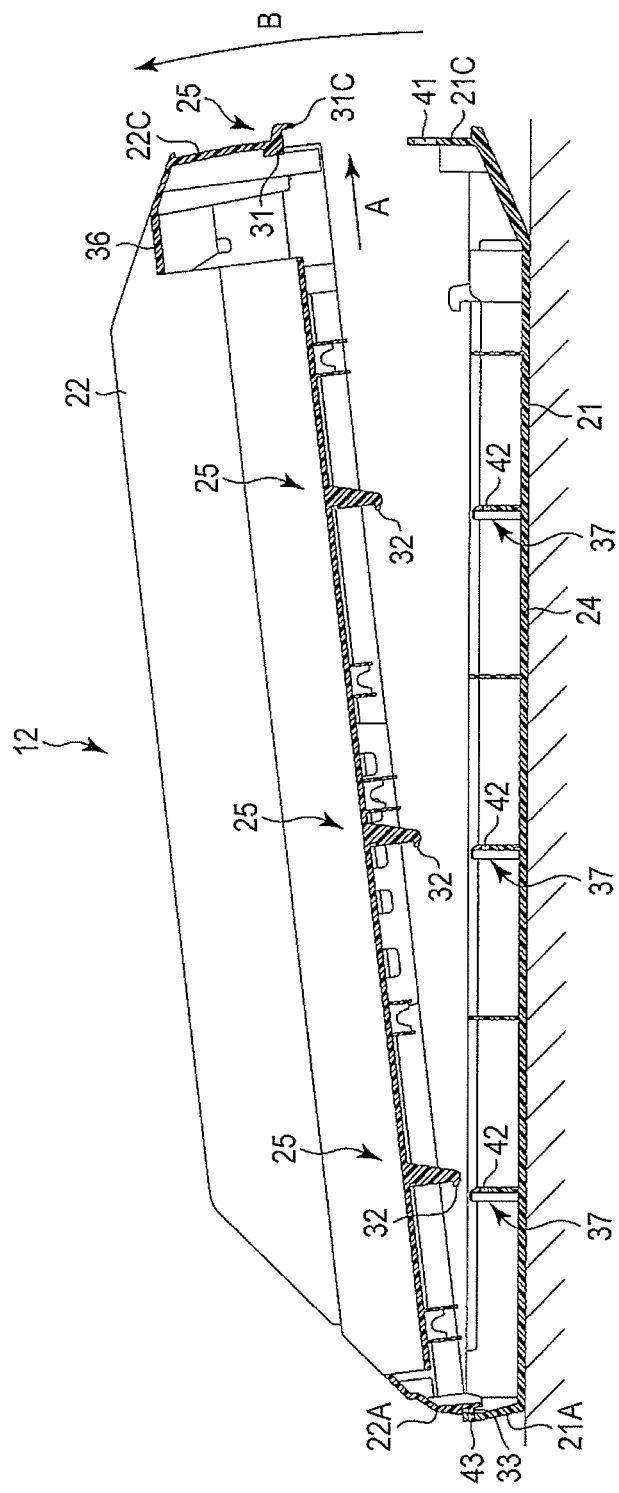
FIG. 13 is an exemplary cross sectional view showing a next step of disassembling the first cover and the second cover shown in FIG. 12 from each other.

Subsequently, as shown in FIG. 13, the vicinity of the second lower side 22C is held by a hand, and also the second cover 22 is rotated in a direction indicated by an arrow B with respect to the vicinity of the third nail portion 33 (the third reception portion 43) so as to pull the second cover 22 upwards. During this operation, the operator while applying a force indicated by the arrow A in FIG. 13 pulls the second cover 22 upwards so as to rotate the second cover 22 in the direction indicated by an arrow B. In this manner, the engagement between the second nail portion 32 and the second reception portion 42 is released, and then when the second cover 22 is rotated in the arrow B direction, the engagement between the third nail portion 33 and the third reception portion 43 is released. Thus, the operation of removing the second cover 22 from the first cover 21 (disassembling operation of the case 17) is smoothly carried out.

In this embodiment, the plurality of nail portions 25 are each formed to be directed in the upper direction U, but the direction in which the plurality of nail portions 25 are arranged is not limited to this. As long as they are directed in the same direction, the plurality of nail portions 25 may be directed in any direction (lower direction L, right direction or left direction).

According to the second embodiment, the television 11 comprises a display panel 14, a first cover 21 which covers a front side of the display panel 14, a second cover 22 which covers a rear side of the display panel 14, a plurality of nail portions 25 on an outer circumferential portion of the second cover 22 and directed in a same direction, and a plurality of reception portions 37 on an outer circumferential portion of the first cover 21 and engaging with the plurality of nail portions 25, respectively.

With this structure, in which a plurality of reception portions 37 are provided on the first cover 21 and a plurality of nail portions 25 are provided on the second cover 22, the operation of disassembling the first cover 21 and the second cover 22 from each other can be smoothly carried out.

In particular, since the plurality of nail portions 25 are directed in the same direction, the disassembling operation can be easily carried out and further an exclusive-use tool is not necessary in the disassembling operation. Moreover, such a drawback that the first cover 21 and the second cover 22 are damaged with a tool or the like, can be avoided. In other words, it is possible to protect these covers, thereby preventing the waste of the first cover 21 and the second cover 22. Consequently, the first cover 21 and the second cover 22 can be assembled together and disassembled from each other repeatedly.

Further, the electronic device is not limited direclty to the above-described embodiment, but it can be realized while remodifying the structural elements thereof withn the scope where the essense thereof remains. Further, various types of embodiments can be achieved by combining or rearranging various structural elements dislcosed in the embodiment appropriately. For example, some of the structural elements may be deleted from the entire structure disclosed in the embodiment. Further, structural elements of varisou versions may be combined together as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first cover including a lower side and an upper side;
a second cover removably attached to the first cover, the second cover including a lower side and an upper side;
a plurality of nail portions provided at least on the lower side and the upper side of either one of the first cover and the second cover; and
a plurality of reception portions provided at least on the lower side and the upper side of the another of the first cover and the second cover and corresponding to the plurality of nail portions, respectively,
wherein the plurality of nail portions are configured to be removably engaged with a corresponding plurality of reception portions such that a direction of engagement of the plurality of nail portions with the plurality of reception portions is in the same direction, the plurality of nail portions are oriented to be disengaged from the corresponding plurality of reception portions without sliding the first cover relative to the second cover.

2. The electronic device of claim 1, wherein:
the plurality of reception portions each further comprises a first reception portion; and
the plurality of nail portions each further comprises a first nail portion movable back and forth with a finger, the first nail portion being released from the engagement with the first reception portion as manipulated with the finger.

3. The electronic device of claim 2, further comprising a plurality of ribs provided on either the one of the first cover and the second cover, the plurality of nail portions comprises a second nail portion provided on a corresponding rib of the plurality of ribs.

4. The electronic device of claim 3, wherein the first nail portion is provided on a lower side of the one of the first cover and the second cover, and
the first reception portion is provided on the lower side of the another of the first cover and the second cover.

5. The electronic device of claim 4, wherein the first nail portion further comprises:
a first reinforcing rib having a height in a thickness direction of the one of the first cover and the second cover which becomes shorter as approaching the another of the first cover and the second cover; and
a second reinforcing rib having a uniform height in a thickness direction of the one of the first cover and the second cover.

6. An image display apparatus comprising:
a display panel;
a first cover which covers a front side of the display panel, the first cover comprises a lower side and an upper side;
a second cover which covers a rear side of the display panel, the second cover comprises a lower side and an upper side;
a plurality of nail portions provided at least on the lower side and the upper side of either one of the first cover and the second cover; and
a plurality of reception portions provided at least on the lower side and the upper side of the another of the first cover and the second cover and corresponding to the plurality of nail portions, respectively,
wherein the plurality of nail portions are directed in different directions and configured to be removably engaged with a corresponding plurality of reception portions such that a direction of engagement of the plurality of nail portions with the plurality of reception portions is the same direction.

7. The electronic device of claim 3, further comprising a panel provided between the first cover and the second cover, wherein the plurality of ribs hold the panel.

8. An electronic device comprising:
a first cover;
a second cover removably attached to the first cover;
a plurality of nail portions situated along a first outer circumferential portion of either one of the first cover and the second cover, the plurality of nail portions include a first nail portion oriented in parallel to a first side of the first outer circumferential portion and at least a second nail portion oriented perpendicular to a second side of the first outer circumferential portion different than the first side of the first outer circumferential portion; and a plurality of reception portions on a second outer circumferential portion of the another of the first cover and the second cover and corresponding to the plurality of nail portions, respectively, wherein the plurality of nail portions are configured to be removably engaged with a corresponding plurality of reception portions such that a direction of engagement of the plurality of nail portions, including the first nail portion and the second nail portion, with the plurality of reception portions is conducted in a same direction.

9. The electronic device of claim 8, wherein the plurality of nail portions include the first nail portion positioned on a first support member that is oriented in parallel to the first side of the first outer circumferential portion, the second nail portion positioned on a second support member that is oriented perpendicular to the second side of the first outer circumferential portion, and a third nail portion positioned on an inner surface of a third side of the first outer circumferential portion, the third side being different than the first side and the second side.

10. The electronic device of claim 9, wherein the second support member is a rib provided on either one of the first cover and the second cover.

11. The electronic device of claim 9, wherein the second nail portion is one of a plurality of second nail portions supporting by a corresponding plurality of ribs positioned along the second side of the first outer circumferential portion.

12. The electronic device of claim 11, further comprising a panel provided between the first cover and the second cover, wherein the corresponding plurality of ribs hold the panel.

13. The electronic device of claim 8, wherein the first nail portion is provided on a lower side of one of the first cover and the second cover, and a first reception portion corresponding to the first nail portion is provided on a lower side of the other one of the first cover and the second cover.

14. The electronic device of claim 8, wherein the first nail portion further comprises:
a first reinforcing rib having a height in a thickness direction of the one of the first cover and the second cover which is tapered upon approaching the another one of the first cover and the second cover; and
a second reinforcing rib having a non-tapered height in a thickness direction of one of the first cover and the second cover.

15. The electronic device of claim 8, wherein the first nail portion further comprises:
a first reinforcing rib having a height in a thickness direction of the one of the first cover and the second cover which is reduced upon approaching the another one of the first cover and the second cover; and
a second reinforcing rib having a uniform height in a thickness direction of one of the first cover and the second cover.

16. The electronic device of claim 1, the plurality of nail portions are oriented so that the direction of engagement of the plurality of nail portions is in the same direction as the plurality of reception portions and the plurality of nail portions are engaged with the corresponding plurality of reception portions without sliding the first cover relative to the second cover.

* * * * *